(12) United States Patent
Zhang et al.

(10) Patent No.: US 7,079,705 B2
(45) Date of Patent: Jul. 18, 2006

(54) COLOR INTERPOLATION FOR IMAGE SENSORS USING A LOCAL LINEAR REGRESSION METHOD

(75) Inventors: Xuemei Zhang, Mountain View, CA (US); Ramakrishna Kakarala, Sunnyvale, CA (US); Todd S. Sachs, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 714 days.

(21) Appl. No.: 10/284,696

(22) Filed: Oct. 30, 2002

(65) Prior Publication Data

US 2004/0086177 A1  May 6, 2004

(51) Int. Cl.
  *G06K 9/00* (2006.01)
  *G06K 9/32* (2006.01)
  *G06K 9/36* (2006.01)
  *H04N 1/46* (2006.01)

(52) U.S. Cl. .............. 382/280; 382/162; 382/300; 358/525

(58) Field of Classification Search ............. 382/162, 382/167, 300, 280; 358/1.9, 523, 525; 348/240.2
See application file for complete search history.

(56) References Cited

U.S. PATENT DOCUMENTS

| 5,652,621 | A  |   | 7/1997  | Adams, Jr. et al. ........ 348/272 |
| 5,867,286 | A  | * | 2/1999  | Lee et al. .................... 358/523 |
| 5,953,465 | A  |   | 9/1999  | Saotome |
| 6,160,635 | A  | * | 12/2000 | Usami ........................ 358/1.9 |
| 6,563,538 | B1 |   | 5/2003  | Utagawa |
| 6,721,003 | B1 | * | 4/2004  | Tsuruoka et al. ........ 348/240.2 |

FOREIGN PATENT DOCUMENTS

| EP | 0 281 709   | 9/1988  |
| JP | 11-136692   | 5/1999  |
| JP | 2000-224601 | 11/2000 |

OTHER PUBLICATIONS

Michael J. Vrhel, Ron Gershon and Lawrence S. Iwan; *Measurement and Analysis of Object Reflectance Spectra*; Color Research & Application, 19(1):4 9, 1994; pp. 4-9.

Bo Tao, Ingeborg Tastl, Ted Cooper, Mike Blasgen and Eric Edwards; *Demosaicing using Human Visual Properties and Wavelet Interpolation Filtering*; Proceedings of the IS&T/SID Seventh Color Imaging Conference: Color Science, Systems, and Applications, Scottsdale, Arizona, 1999; pp. 252-256.

(Continued)

*Primary Examiner*—Duy M. Dang

(57) ABSTRACT

An image processing system and demosaicing method are provided to calculate estimated missing color sensor values in an image using a linear prediction from the raw color sensor value at the current pixel location. The raw image is divided into regions of sensor values, and the linear relations between color planes for each region are determined by a regression method that calculates the degree to which different color planes co-vary within each region The missing color sensor values per region are calculated as a scaled and shifted version of the raw color sensor values using linear regression coefficients determined from the local linear regression process.

26 Claims, 8 Drawing Sheets

OTHER PUBLICATIONS

David H. Brainard; *Bayesian Method for Reconstructing Color Images from Trichromatic Samples*; IS&T's 47th Annual Conference/ICPS, Rochester, New York, 1994; pp. 375-380.

Stephen Pollard and Andrew Hunter; *Gaussian Smoothing*; Notes on simplified color image demosaicing; Hewlett Packard Internal Memo; www.dai.ed.ac.uk; Aug. 19, 2002; pp. 1-8.

European Search Report dated Jan. 25, 2005.

* cited by examiner

COLOR INTERPOLATION FOR IMAGE SENSORS USING A LOCAL LINEAR REGRESSION METHOD

BACKGROUND OF THE INVENTION

1. Technical Field of the Invention

The present invention relates generally to image sensors, and specifically to image processing of sensor values.

2. Description of Related Art

Electronic image sensors are predominately of two types: CCDs (Charge Coupled Devices) and CMOS-APS (Complimentary Metal Oxide Semiconductor-Active Pixel Sensors). Both types of sensors typically contain an array of photo-detectors, arranged in a pattern, that sample light and/or color within an image. Each photo-detector corresponds to a pixel of an image and measures the intensity of light of the pixel within one or more ranges of wavelengths.

In addition, both types of sensors may include a color filter array (CFA), such as the CFA described in U.S. Pat. No. 3,971,065 to Bayer (hereinafter referred to as Bayer), which is hereby incorporated by reference. With the Bayer CFA, each pixel sees only one wavelength range, corresponding to the perceived color red, green or blue. The Bayer mosaic pattern of color filters is shown below (the letters R, G1, G2, and B represent the colors red, green on the red rows, green on the blue rows, and blue, respectively, for a single pixel).

| R  | G1 | R  | G1 | R  |
|----|----|----|----|----|
| G2 | B  | G2 | B  | G2 |
| R  | G1 | R  | G1 | R  |
| G2 | B  | G2 | B  | G2 |
| R  | G1 | R  | G1 | R  |

To obtain the sensor values for all three primary colors at a single pixel location, it is necessary to interpolate the color sensor values from adjacent pixels. This process of interpolation is called demosaicing. There are a number of demosaicing methods known today. By way of example, but not limitation, various demosaicing methods have included pixel replication, bilinear interpolation and median interpolation.

Many of the existing demosaicing algorithms interpolate the missing sensor values from neighboring sensor values of the same color plane, under the assumption that the sensor values of neighboring pixels are highly correlated in an image (hereinafter referred to as the neighboring correlation assumption). However, for image regions with sharp lines and edges, the correlation among neighboring pixels may be poor. Therefore, demosaicing based on the neighboring correlation assumption may generate color aliasing artifacts along edges and in regions with fine details. In addition, neighboring correlation assumption demosaicing methods may generate images with independent noise levels among the color planes, resulting in higher noise amplification during color correction processing.

Other demosaicing algorithms have incorporated both the neighboring sensor values and the raw sensor value of the current pixel when calculating the missing color values. Such algorithms operate under the assumption that different color sensor values of the same pixel are usually highly correlated (hereinafter referred to as the color correlation assumption). The correlation among the different colors is assumed to either be fixed for all images or the same across a single image. Color correlation assumption demosaicing methods can offer improved edge and line reconstruction with less chromatic aliasing. However, in some images, the improved edge and line reconstruction comes at the cost of reduced color saturation due to assumptions of fixed positive correlation among different color planes. Therefore, what is needed is a demosaicing algorithm that improves edge and line reconstruction in an image without reduced color saturation. In addition, what is needed is a demosaicing algorithm that is tolerant of noise amplification during the color correction process.

SUMMARY OF THE INVENTION

Embodiments of the present invention provide an image processing system implementing a demosaicing algorithm that calculates estimated missing color sensor values in an image using a linear prediction from the raw color sensor values. The raw image is divided into regions of sensor values, and the linear relations between color planes for each region are determined by a regression method that calculates regression coefficients corresponding to the degree to which different color planes co-vary in a region. The missing color sensor values per region are calculated as a scaled and shifted version of the raw color sensor values, using the linear regression coefficients determined from the local linear regression process.

In one embodiment, a simple demosaicing process, such as bilinear interpolation, is applied to a region of sensor values prior to determining the linear regression coefficients between different color planes for the region. In other embodiments, the regression coefficients are determined from the raw sensor values themselves.

In further embodiments, where the assumption of a single linear correlation is violated for image regions with multiple object colors, the missing sensor values can be interpolated using the simple demosaiced results previously calculated or using a more sophisticated linear regression method to determine multiple regression coefficients for regions with several different linear relationships.

Since all missing pixels of a color channel within one region are calculated with a single set of linear regression coefficients, the linear relations between sensor values of the pixels within the region are preserved, resulting in less blurring and less chromatic aliasing in the final image compared with neighboring correlation assumption demosaicing methods. In addition, the noise terms between different color channels are correlated, thereby reducing noise amplification in subsequent processing compared with other neighbor correlation and color correlation assumption demosaicing methods. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF EXEMPLARY EMBODIMENTS

The numerous innovative teachings of the present application will be described with particular reference to exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

For most image sensors, at any pixel location, the captured sensor values for different colors are highly correlated, meaning that the sensor values for different colors are predictably sloped and offset from one another. The correlation amongst the different colors is a result of the photo-detectors at a pixel location having largely overlapping sensitivities and the fact that objects captured in an image generally have smooth surface reflectance curves.

Figure 1:
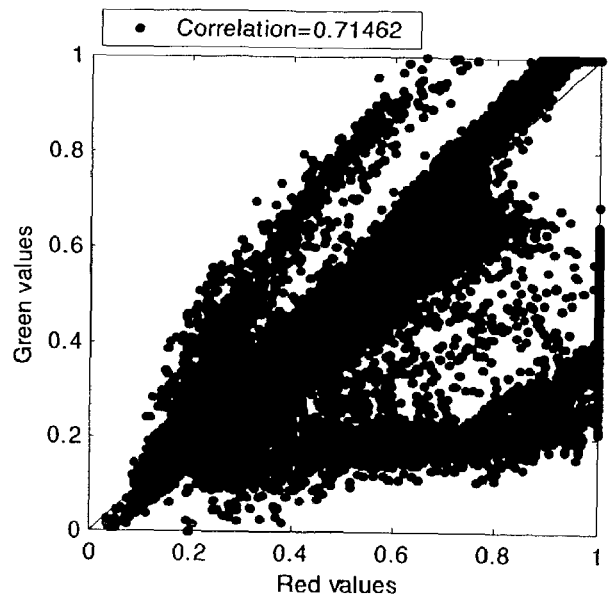
FIG. 1 is a chart illustrating the linear correlation between color planes of all pixels in an image.

However, the correlation amongst colors tends to be only moderate when calculated over an entire image that contains multiple objects of different colors. Referring now to FIG. 1, there is illustrated a chart depicting the linear correlation between two color planes for all pixels in a sample image (not shown). In FIG. 1, the green color value of a pixel location is plotted against the red color value of the same pixel location for all pixels in an image. As can be seen in FIG. 1, there is an overall positive correlation between the red values and green values. The correlation coefficient is 0.71, which indicates that about 50% of the variance in green values can be predicted by the red values (the amount of variance accounted for is calculated by the square of the correlation coefficient).

However, there are subsets of pixels in FIG. 1 that have different relations between red and green color values, shown as bands with different slopes in the scatter plot. To improve the correlation between red and green values for the pixels in each of these bands, a different linear relation between red and green values at pixel locations within the bands should be calculated for each of the bands The correlation between red and green color values for the entire image (i.e., 0.71) is not high enough to produce accurate calculates of missing pixel values at individual pixel locations.

Figure 2:
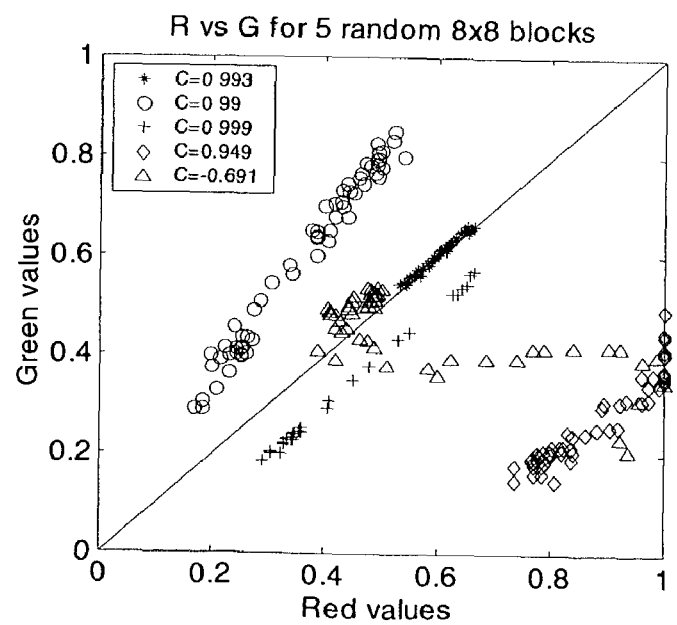
FIG. 2 is a chart illustrating the linear correlation between color planes of pixels in different regions of an image.

Referring now to FIG. 2, in accordance with embodiments of the present invention, the correlation levels improve significantly when the green values are plotted against the red values for smaller regions of the same image. In FIG. 2, five 8×8 regions of pixels have been randomly chosen from the image plotted in FIG. 1. Within four of the individual region, the correlation coefficient is on average much higher (e.g., greater than 0.9), although different regions have different slopes and offsets. For one of the regions, the correlation coefficient is even negative. The higher correlation results in reduced color aliasing artifacts in images demosaiced based on the local correlation in regions of the image.

Figure 3:
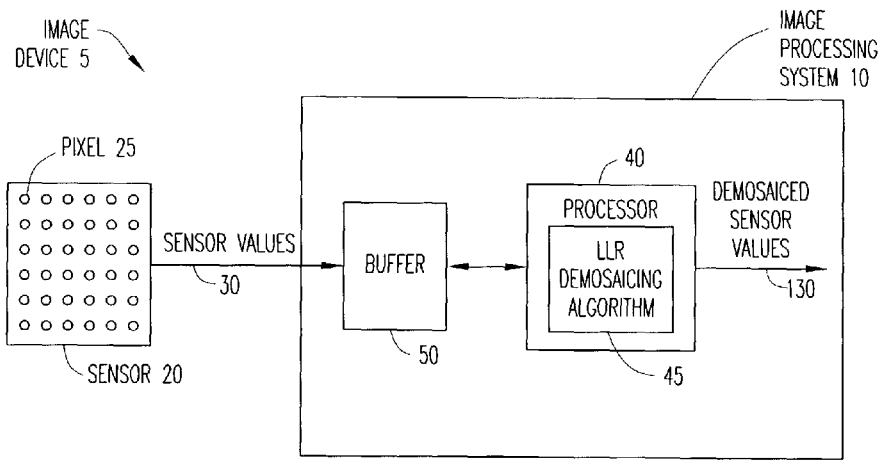
FIG. 3 is a block diagram illustrating an image processing system utilizing a local linear regression demosaicing algorithm in accordance with exemplary embodiments of the present invention.

Referring now to FIG. 3, there is illustrated an image device 5 having an image processing system 10 implementing a local linear regression (LLR) demosaicing algorithm 45, in accordance with the present invention. The image device 5 can be incorporated as part of any digital imaging device, such as a camera, video camera, medical imaging device, etc. The image device 5 can further be at least partially incorporated on a computer system, such as a personal computer or server, having a memory therein for storing image data. Thus, the algorithm 45 can be located within a digital imaging device or as part of an image processing software running on a personal computer or server.

The image device 5 includes an image sensor 20, such as a CMOS sensor chip or a CCD sensor chip, which includes a two-dimensional array of pixels 25 arranged in rows and columns. The image sensor 20 may be covered by a color filter array (CFA), such that each pixel 25 senses only one color. For example, the CFA can be the well-known Bayer CFA, in which chrominance colors (red and blue) are interspersed amongst a checkerboard pattern of luminance colors (green). It should be understood that the LLR demosaicing algorithm 45 described herein is also applicable to other CFA configurations, such as CMY (cyan, magenta, yellow) sensor mosaics, or other n-color ($n \geq 3$) sensor mosaics.

The image sensor 20 provides raw sensor values 30 containing the original red, blue and green pixel values to a digital signal processor 40 within the image processing system 10 capable of applying the LLR demosaicing algorithm 45 of the present invention to the sensor values 30. The sensor values 30 are divided into regions and provided to the digital signal processor 40 one region at a time. Thus, the sensor values 30 are stored in a buffer 50 until the requisite number of sensor values 30 is present to begin processing. The buffer 50 can be implemented as a storage device external to the processor 40 (e.g., RAM) or within the processor 40 (e.g., internal register, stack or cache). In other embodiments, the buffer 50 and/or processor 40 can be built into the sensor chip itself.

The number of sensor values 30 needed to begin processing depends on the size of the regions that the image is divided into for processing purposes. For example, the sensor values 30 are typically read off the sensor 20 one row at a time. Therefore, to process an 8×8 block of sensor values 30, eight rows of sensor values would need to be stored in the buffer 50.

The LLR demosaicing algorithm 45 determines the linear relations between color planes for each region by a regression method that determines coefficients of best-fitting linear functions that relate pixel values of different color planes for each region. The missing color sensor values per region are calculated as a scaled and shifted version of the raw color sensor values, using the linear regression coefficients estimated from the local linear regression process.

After demosaicing of the image using the LLR demosaicing algorithm 45 is complete, the demosaiced (interpolated and raw) sensor values 130 can be used in subsequent processing. For example, the demosaiced sensor values 130 can be subjected to a color correction process, compression process for storage purposes or color conversion process to output the image to an output device, such as a video screen, computer screen or printer.

Figure 4:
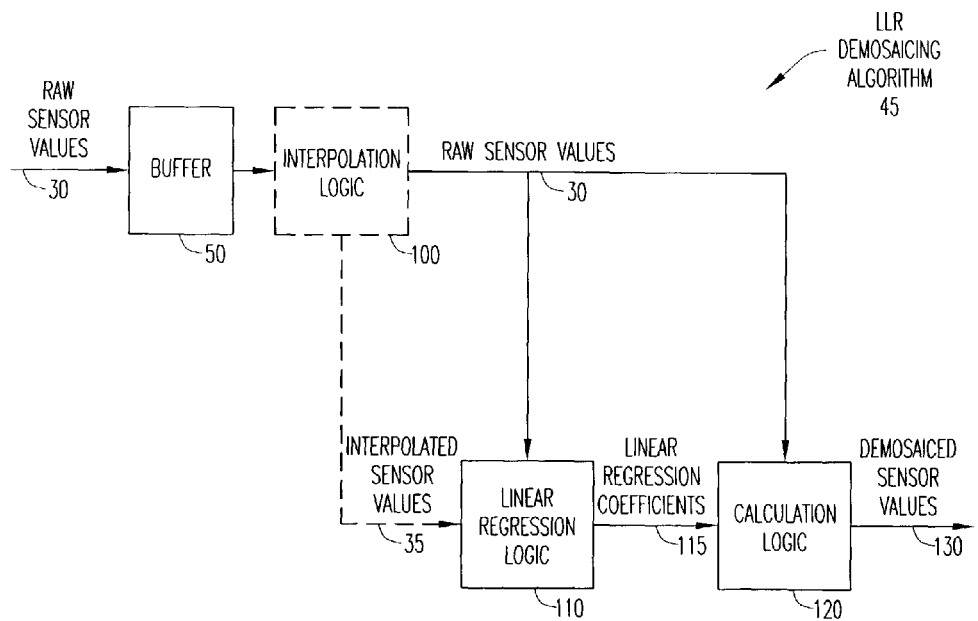
FIG. 4 is a logic flow diagram illustrating exemplary logic for implementing the local linear regression demosaicing algorithm in accordance with exemplary embodiments of the present invention.

Referring now to FIG. 4, there is illustrated exemplary logic for implementing the LLR demosaicing algorithm 45, in accordance with embodiments of the present invention. The LLR demosaicing algorithm 45 takes as input the raw sensor values 30 provided by the buffer 50. Interpolation logic 100 receives blocks of sensor values 30 at a time and calculates interpolated sensor values 35, using any fast and simple demosaicing process, such as bilinear or direct linear interpolation. The blocks correspond to the regions into which the image is divided. It should be understood that as used herein, the term "logic" refers to the hardware, software and/or firmware for performing the stated function.

Figure 6:
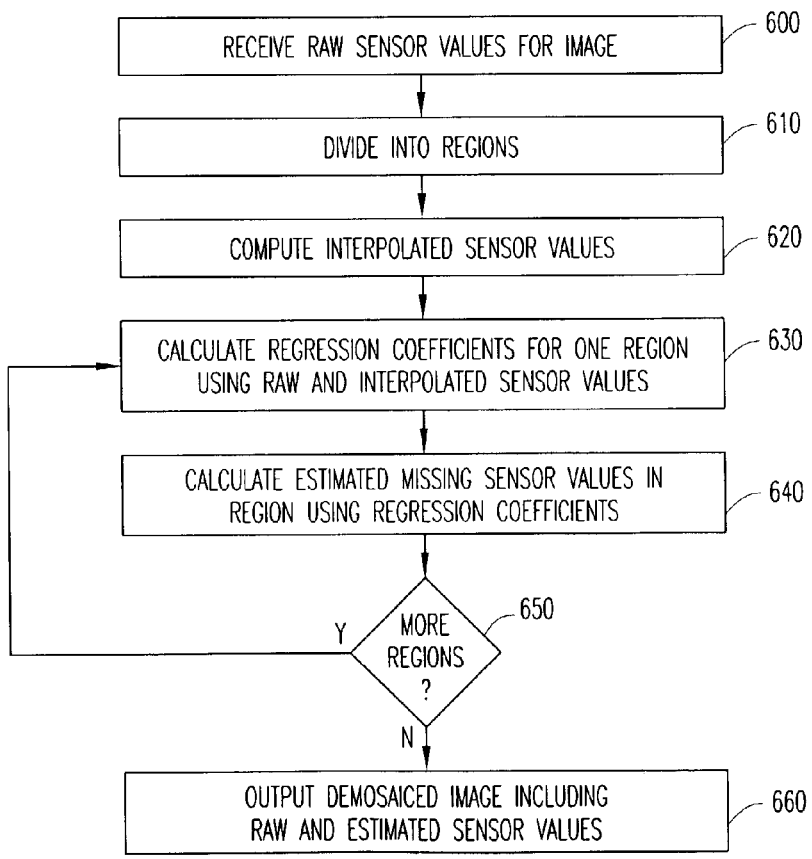
FIG. 6 is a flow chart illustrating exemplary steps for performing the local linear regression demosaicing algorithm using raw and interpolated sensor values, in accordance with embodiments of the present invention.

The raw sensor values 30, and in some embodiments (as shown in FIG. 6), the interpolated sensor values 35, for each region are provided to linear regression logic 110 to determine linear regression coefficients 115 (slope and intercept) between different color planes for each region. The linear regression coefficients 115 are further provided to calculation logic 120 where they are used to calculate estimated missing color sensor values in the region from the raw sensor values using linear prediction. The calculated missing color sensor values are estimates of what the actual missing color sensor values would have been had the missing color sensor values been measured by the sensor.

Since all missing color sensor values in a particular region of the image are estimated from the raw color sensor values with the same linear regression coefficients, the linear relations between sensor values of the pixels within the region are preserved, resulting in less blurring and less chromatic aliasing in the final demosaiced image. In addition, due to the fact that demosaiced values and the raw values are linearly related, noise amplification in the color correction process that normally follows the demosaicing step can be reduced using the LLR demosaicing algorithm of the present invention. The benefit of noise amplification reduction is especially significant when using image sensors that have broad-wavelength sensitivities (such as a CMY sensor). For these broad-wavelength sensors, the color correction matrix elements tend to have large values that contribute to noise amplification in the final processed image.

For example, assuming that the raw mosaiced image has an additive noise element n that is independently and identically distributed for each pixel, with a mean of 0 and standard deviation of $\sigma$, the color sensor values (e.g., red, green and blue) can be represented as:

$$r = r_0 + n,$$

$$g = g_0 + n,$$

$$b = b_0 + n,$$

where $r_0$, $g_0$, $b_0$ are the true pixel values before any noise is added through the image capturing process. After traditional demosaicing by interpolation from neighboring pixels, the estimated color sensor value has a noise element that is correlated with the noise of its neighbors, but not with the noise element of the raw color sensor value of the same pixel (i.e., the noise elements are independent between the different color planes, and the overall noise level of the image is a combination of the independent noise elements of the three color channels).

If $c_{ij}$ ($i \in \{1,2,3\}$, $j \in \{1,2,3\}$) is the color correction matrix that converts from sensor RGB (or CMY) values to display RGB values, the display RGB values, denoted $x_r$, $x_g$, $x_b$, can be calculated as:

$$x_r = c_{11}r + c_{12}g + c_{13}b,$$

$$x_g = c_{21}r + c_{22}g + c_{23}b,$$

$$x_b = c_{31}r + c_{32}g + c_{33}b.$$

The noise distributions for $x_r$, $x_g$, $x_b$ have means of 0s and standard deviations that are a function of $c_{ij}$. When the demosaiced r,g,b values have independent (or close to independent) noise elements, the standard deviations of the noise terms for $x_r$, $x_g$, $x_b$ are:

$$\sigma_{x_r} = \sqrt{(c_{11}^2 + c_{12}^2 + c_{13}^2)}\sigma,$$

$$\sigma_{x_y} = \sqrt{(c_{21}^2 + c_{22}^2 + c_{23}^2)}\sigma,$$

$$\sigma_{x_b} = \sqrt{(c_{31}^2 + c_{32}^2 + c_{33}^2)}\sigma.$$

For an RGB sensor with a white-preserving color correction matrix (i.e., matrix rows sum to 1), the color matrix typically has diagonal terms that are greater than one and off-diagonal terms that are less than one or even negative. A color matrix example for an RGB sensor is shown in the array below. For such a matrix, the noise amplification is greater than one when demosaiced r,g,b values have independent noise terms.

| | | |
|---|---|---|
| 3.5973 | −1.4865 | −1.1109 |
| −0.4658 | 1.9183 | −0.4526 |
| −0.1898 | −1.1079 | 2.2977 |

For CMY sensors, the color matrices tend to have much larger values, often with large negative terms, as shown in the example matrix below. The noise amplification is greater for these CMY sensors if the demosaiced r,g,b values have independent noise terms.

| | | |
|---|---|---|
| 3.5303 | 2.4996 | −5.0298 |
| −1.8741 | 1.1569 | 1.7171 |
| 2.2584 | −2.9010 | 1.6426 |

With the LLR demosaicing algorithm of the present invention, missing color sensor values for all pixels in a local image region are calculated as a scaled and shifted version of the raw color sensor values. Therefore, the interpolated color sensor values correlate well with the raw color sensor values in a local image region, and thus, the noise terms are highly correlated. The standard deviations of the noise terms for $x_r$, $x_g$, $x_b$ become:

$$\sigma_{x_r} = (c_{11} + c_{12} + c_{13})\sigma,$$

$$\sigma_{x_g} = (c_{21} + c_{22} + c_{23})\sigma,$$

$$\sigma_{x_b} = (c_{31} + c_{32} + c_{33})\sigma.$$

Figure 5:
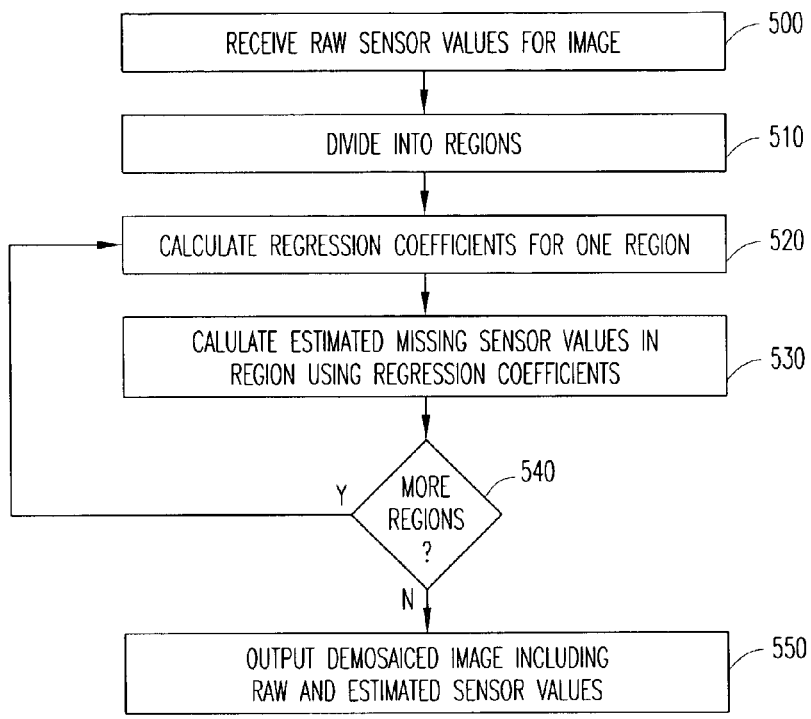
FIG. 5 is a flow chart illustrating exemplary steps for performing the local linear regression demosaicing algorithm illustrated in FIG. 4.

Since $c_{i1} + c_{i2} + c_{i3} = 1$, the noise amplification factor in the local image region is one. Therefore, with the LLR demosaicing algorithm of the present invention, noise amplification is limited, which improves the final image quality Exemplary steps within the LLR demosaicing algorithm are shown in FIG. 5. Initially, the measured raw digital sensor values representing an image are provided to a digital signal processor (step 500) for demosaicing of the raw sensor values. These received raw sensor values are divided into regions for separate demosaicing (step 510). For example, the sensor values can be divided into n×n blocks or n×m blocks, with each block containing the same or a different number of sensor values. Upon retrieving the sensor values from the buffer for a particular region, a linear regression of the raw sensor values in the region is performed to determine the linear regression coefficients (slopes and offsets) that describe the linear relationships between the different color planes in that region (step 520). From the linear regression coefficients, estimated missing color sensor values at each pixel location in that region are calculated (step 530).

The linear regression coefficients are estimated separately for each region using only the raw sensor values for that region. The missing color sensor values for each region are calculated separately using the specific linear regression coefficients and raw sensor values for that region. Once the missing color sensor values in all regions of the image have been calculated (step 540), the final demosaiced image can be output from the digital signal processor for further processing or display (step 550). The final demosaiced image includes both the original raw sensor values and the calculated missing color sensor values at each pixel location In one embodiment, the linear regression coefficients for each region are determined using both the raw sensor values and simple interpolated sensor values. Turning now to FIG. 6, there is illustrated exemplary steps for performing the local linear regression demosaicing algorithm using raw and interpolated sensor values, in accordance with embodiments of the present invention. Upon receiving the raw sensor values (step 600) and dividing the sensor values into regions (step 610), as a first step, a simple demosaicing algorithm, such as bilinear interpolation or median interpolation, can be applied to the mosaiced image (step 620). The simple demosaicing process creates three full color planes (e.g., R, G, and B), each including both original raw and interpolated color sensor values. It should be understood that the simple demosaicing algorithm can be any simple and fast algorithm that does not alter the raw color sensor values.

To determine the linear regression coefficients for each region, both the interpolated and raw color values are used (step 630). For example, let $r_i$, $g_i$, $b_i$ represent individual r,g,b color sensor values for pixel i in a block of n×n pixels. To determine the regression coefficients (slopes S and offsets A) used to calculate R values from G values ($S_{rg}$, $A_{rg}$), R values from B values ($S_{rb}$, $A_{rb}$), etc., variance and covariance terms must be calculated. For example, if $\bar{r}$, $\bar{g}$, $\bar{b}$ represent the mean r,g,b values in the current image region, the sums of squares for the variance (SS) and covariance (CS) terms are:

$$SS(R) = \sum_{i=1}^{n^2} (r_i - \bar{r})^2;$$

$$SS(G) = \sum_{i=1}^{n^2} (g_i - \bar{g})^2;$$

$$SS(B) = \sum_{i=1}^{n^2} (b_i^2 - \bar{b})^2;$$

$$CS(RG) = \sum_{i=1}^{n^2} (r_i - \bar{r})(g_i - \bar{g});$$

$$CS(GB) = \sum_{i=1}^{n^2} (g_i - \bar{g})(b_i - \bar{b});$$

$$CS(RB) = \sum_{i=1}^{n^2} (r_i - \bar{r})(b_i - \bar{b}).$$

From the variance and covariance sums of squares, the linear regression coefficients $S_{yx}$ (slope) and $A_{yx}$ (offset) that are used to predict color value y from color value x can be calculated as follows (only the coefficients for the R and G planes are shown for convenience, although other color planes are similar):

$$S_{rg} = \frac{CS(RG)}{SS(G)}, A_{rg} = \bar{r} - \bar{g}S_{rg};$$

$$S_{gr} = \frac{CS(RG)}{SS(R)}, A_{gr} = \bar{g} - \bar{r}S_{gr}.$$

When calculating the variance and covariance terms for a particular region, either all of the sensor values for that particular region or only a subset of the sensor values from that region can be used, depending upon the particular application. In other embodiments, the linear regression coefficients are not calculated, but rather look-up tables can be built to represent the linear functions relating different color planes based on average intensities for the different color planes.

Once the linear regression coefficients are determined, estimated missing color sensor values for the region can be calculated (step 640). For example, for all G pixel locations in the raw mosaic, the missing R and B values r', g' can be calculated from the G values using $S_{rg}$, $A_{rg}$ and $S_{bg}$, $A_{bg}$ in the following way:

$$r_i' = A_{rg} + S_{sg} * g_i,$$

$$b_i' = A_{bg} + S_{bg} * g_i.$$

Similar estimations for the region can be applied to all of the missing R and G values at the B pixel locations, and all of the missing G and B values at the R pixel locations to result in a full three-color image for the region. This process is repeated for all regions (e.g., n×n blocks or n×m blocks) in the image (step 650) to produce a final demosaiced image (step 660)

Figure 7:
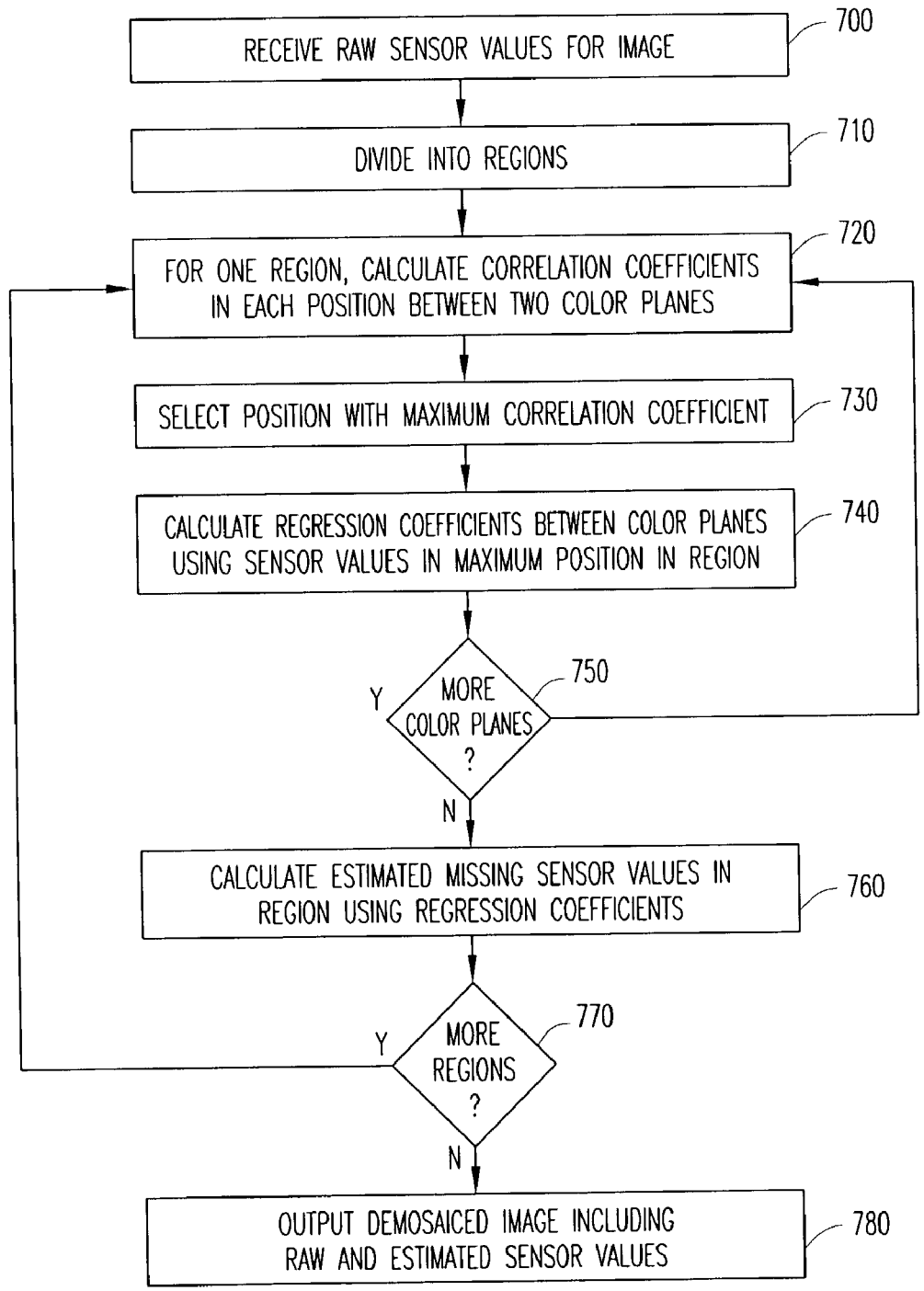
FIG. 7 is a flow chart illustrating exemplary steps for performing the local linear regression demosaicing algorithm using only raw sensor values, in accordance with other embodiments of the present invention.

In other embodiments, the linear regression coefficients can be determined using only the raw sensor values. Turning now to FIG. 7, there is illustrated exemplary steps for performing the local linear regression demosaicing algorithm using only raw sensor values, in accordance with other embodiments of the present invention. Instead of performing a simple interpolation step, upon receiving the raw sensor values (step 700) and dividing the sensor values into regions (step 710), the linear regression coefficients for each region are determined from only the raw color sensor values.

For example, to determine the linear regression coefficients for a Bayer mosaic image, let $r_i$ represent individual r color values for a particular image region. For each $r_i$, let $g_{i1}, g_{i2}, g_{i3}, g_{i4}$ represent green pixels that are immediately above, below, to the left, and to the right of $r_i$. As an initial step, correlation coefficients $\rho_1, \rho_2, \rho_3, \rho_4$ between r and each of the four groups of g values are calculated (step 720) as follows:

$$\rho_j = \frac{CS(RG_j)}{\sqrt{SS(G_j) \times SS(R)}},$$

where $CS(RG_j)$ and $SS(G_j)$ are calculated in a similar fashion as shown above in connection with FIG. 6, except that the green values used are $g_{ij}$, with j=1, 2, 3, 4 corresponding to each of the green pixel positions.

In a flat region of the image, the correlations between red and all four green values should be similar. However, in regions with a lot of high spatial frequency patterns, the $\rho_j$ values can vary significantly. For example, in an image region with high horizontal frequency patterns, the correlation between r and $g_3, g_4$ (left and right green pixels) will be high, whereas $\rho_1$ and $\rho_2$ will be low. Therefore, in order to avoid introducing color aliasing artifacts, the green pixel position that yields the highest correlation is selected to determine the linear regression coefficients between R and G color values (step 730).

For example, if jmax denotes the green pixel position with the highest correlation with the red values for a particular region, the linear regression coefficients $S_{yx}$ (slope) and $A_{yx}$ (offset) that are used in the region to predict color value y from color value x can be calculated as follows (step 740) (only the coefficients for the r and g planes are shown for convenience, although other color planes are similar):

$$S_{rg} = \frac{CS(RG_{j\max})}{SS(G_{j\max})}, A_{rg} = \bar{r} - \overline{g_{j\max}}S_{rg};$$

$$S_{gr} = \frac{CS(RG_{j\max})}{SS(R)}, A_{gr} = \overline{g_{j\max}} - \bar{r}S_{gr}.$$

Once the linear regression coefficients for one set of color planes are determined, the process is repeated for all other sets of color planes (step 750) From the linear regression coefficients for all of the color planes, estimated missing color sensor values for the region can be calculated (step 760) as described above in connection with FIG. 6. This process is repeated for all regions (e.g., n×n blocks or n×m blocks) in the image (step 770) to produce a final demosaiced image (step 780).

Figure 8:
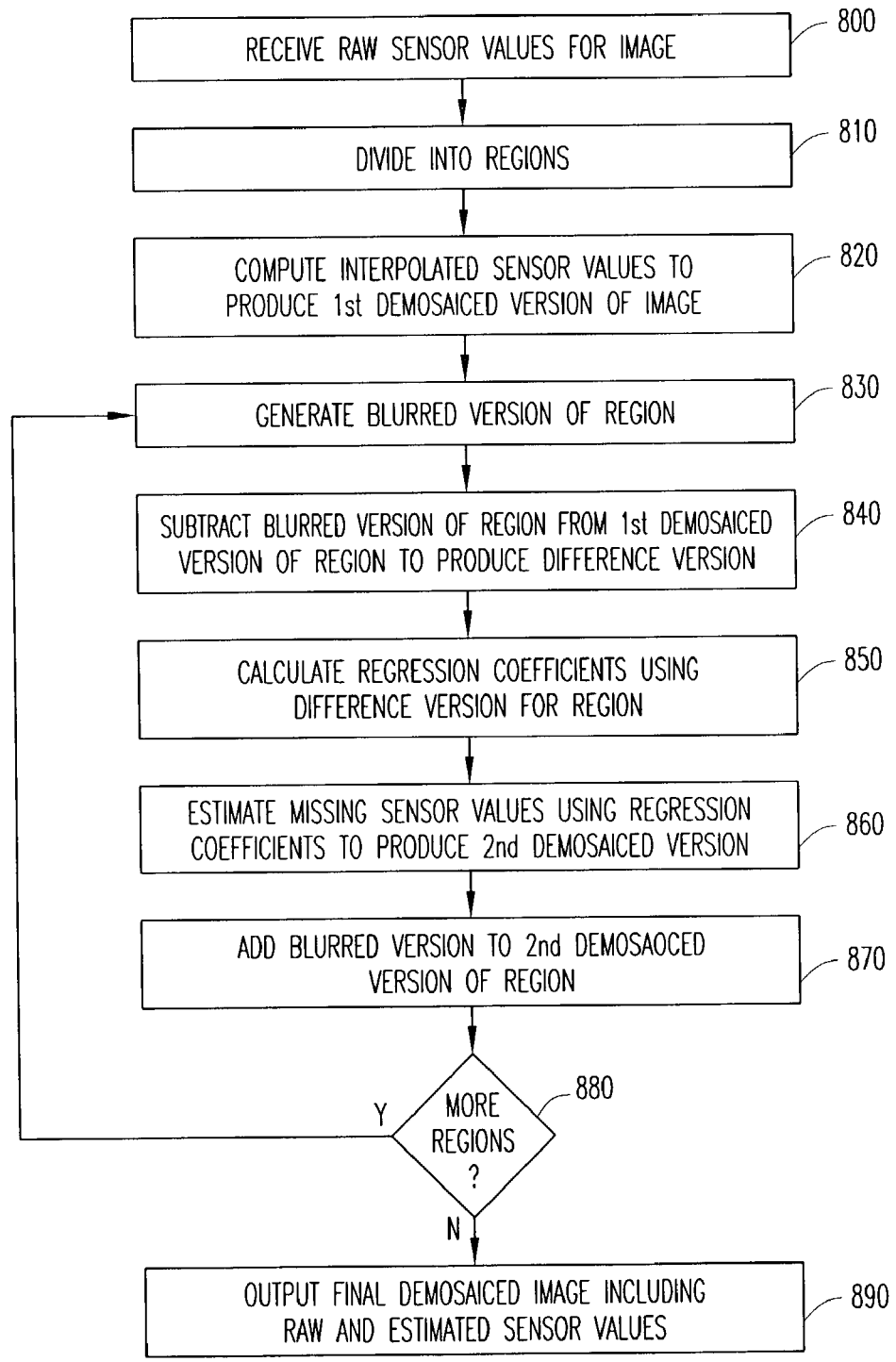
FIG. 8 is a flow chart illustrating exemplary steps for performing the local linear regression demosaicing algorithm using a blurred image, in accordance with further embodiments of the present invention.

In a further embodiment, to reduce the number of aliasing artifacts in the LLR demosaicing algorithm embodiment described above in connection with FIG. 6, the LLR demosaicing algorithm can be performed on only the high spatial frequency components of the image. Referring now to FIG. 8, exemplary steps for performing the local linear regression demosaicing algorithm using the high spatial frequency components of the image are illustrated, in accordance with further embodiments of the present invention Upon receiving the raw sensor values (step 800) and dividing the sensor values into regions (step 810), a simple demosaicing algorithm is applied to the mosaiced image to produce a first demosaiced version of the image region (step 820). Thereafter, a blurred version of the first demosaiced version of the image region is generated through a convolution with a gaussian kernel of a similar size as the region size (step 830). The gaussian convolution acts as a lowpass frequency filter, thereby removing the details from the image. It should be understood that other lowpass kernels can be used instead of the gaussian kernel. The blurred version is then subtracted from the first demosaiced version to generate a difference image, which contains only the high spatial frequency components of the original image (step 840).

Subsequent regression and missing color sensor value estimation calculations are operated on the difference image (steps 850 and 860), as described above in connection with FIG. 6 or 7, to produce a second demosaiced version of the image region. After the second demosaiced version is completed for a region, the blurred version associated with the region is added back to the second demosaiced version (step 870) to produce a final demosaiced version of the image region. This process is repeated for all regions (e.g. n×n blocks or n×m blocks) in the image (step 880) to produce a final demosaiced image (step 890).

Figure 9:
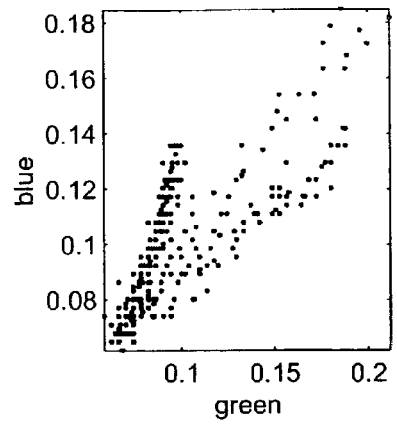
FIG. 9 is a chart illustrating the violation of the linear correlation assumption in a particular region of an image.

Although the general assumption of the present invention is that within a small local region, the R, G and B color sensor values have a high linear correlation, there may be some image regions where this assumption is violated. FIG. 9 shows blue color values plotted against corresponding green color values for all pixels in a particular region of a sample image It can easily be seen in FIG. 9 that three linear functions are needed to describe the relationship between blue and green color values. Therefore, if only one linear function is used to predict blue from green, as is done in the local regression method described above, most blue sensor value calculates at the green pixel locations will be inaccurate, resulting in a grid-like error pattern.

Grid artifacts typically involve groups of color sensor values that are all under calculated or over calculated, which results in color sensor values that are lower or higher than their neighboring pixels (hence the grid-like pattern). Therefore, to detect grid artifacts, a comparison can be made between the demosaicied color sensor values produced from the LLR demosaicing algorithm and the interpolated color values produced from the simple demosaicing step described above in connection with FIGS. 6 and 8.

Figure 10:
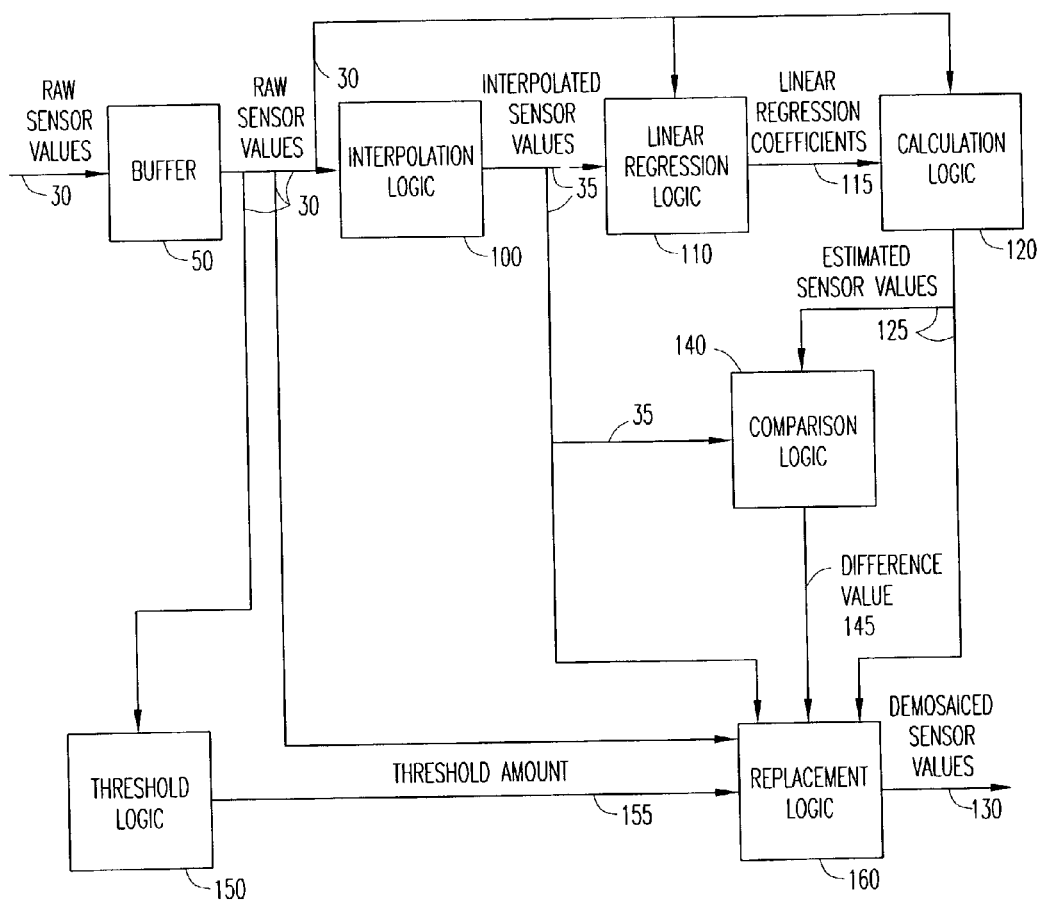
FIG. 10 is a logic flow diagram illustrating exemplary logic for implementing the linear regression demosaicing algorithm with a linear correlation violation procedure in accordance with exemplary embodiments of the present invention.

With reference now to FIG. 10, there is illustrated exemplary logic for removing grid artifacts from an image demosaiced using the LLR demosaicing algorithm 45, in accordance with embodiments of the present invention. The LLR demosaicing algorithm 45 takes as input the raw sensor values 30 provided by the buffer 50. Interpolation logic 100 receives blocks of sensor values 30 at a time and calculates interpolated sensor values 35, using any fast and simple demosaicing process, such as bilinear or direct linear interpolation. The blocks correspond to the regions into which the image is divided.

The raw sensor values 30, and in some embodiments (as described above in connection with FIG. 6), the interpolated sensor values 35, for each region are provided to linear regression logic 110 to determine the linear regression coefficients 115 (slope and intercept) between different color planes for each region. The linear regression coefficients 115 are further provided to calculation logic 120 where they are used to calculate the estimated missing color sensor values in the region from the raw sensor values using linear prediction.

The raw sensor values 30 are further provided to threshold logic 150 to compute a threshold amount 155. In one embodiment, the threshold amount 155 can be variable depending on the light conditions of the image. For example, in low light conditions, the sensor values are low and the signal to noise ratio is low, thus requiring a higher threshold amount 155 for determining whether a grid artifact has occurred. By contrast, in normal or bright light conditions, the sensor values are high and the signal to noise ratio is high, thereby enabling a lower threshold amount 155 to be set for determining whether a grid artifact has occurred. In other embodiments, the threshold amount 155 can be preconfigured by the manufacturer or can be set by the camera operator.

The interpolated sensor values 35 and calculated sensor values 125 are further provided to comparison logic 140 to determine whether any grid artifacts are present in the image region. Comparison logic 140 compares the calculated sensor value 125 of each pixel to the corresponding interpolated sensor value 35 of each pixel and outputs difference values 145 for the color planes for each pixel. The difference values 145, the raw sensor values 30, the interpolated sensor values 35, the calculated sensor values 125 and the threshold amount 155 are provided to replacement logic 160 to output the final demosaiced sensor values 130. The final demosaiced sensor values 130 include the raw sensor values 30, the calculated sensor values 125 and the interpolated sensor values 35 as a substitute for the calculated sensor values 125 for those pixels where the difference value exceeding the threshold amount indicates that a grid artifact occurred as a result of LLR demosaicing.

Figure 11:
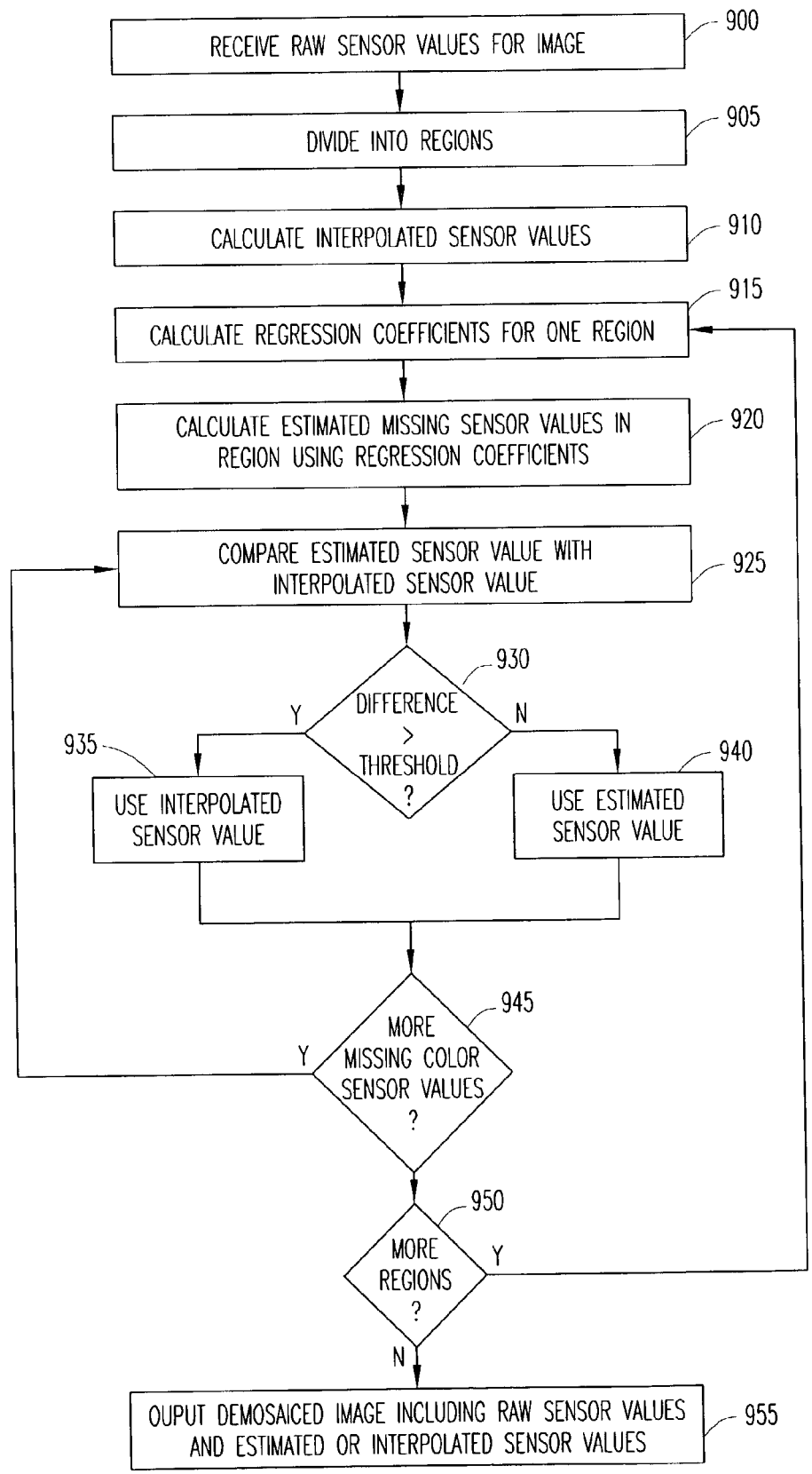
FIG. 11 is a flow chart illustrating exemplary steps for determining whether an image region violates the linear correlation assumption and replacing sensor values in violated areas, in accordance with embodiments of the present invention.

Exemplary steps for removing grid artifacts from an LLR demosaiced image are shown in FIG. 11. Upon receipt of the raw sensor values (step 900) and division of the sensor values into regions for separate demosaicing (step 905), a simple demosaicing algorithm is applied to the mosaiced image (step 910) to create three full color planes (e.g., R, G and B), each including both original raw and interpolated color sensor values. Thereafter, the linear regression coefficients (slopes and offsets) that describe the linear relationships between the different color planes in that region (step 915) are determined from both the interpolated and raw sensor values, as described above in connection with FIG. 6, or from only the raw sensor values, as described above in connection with FIG. 7. From the linear regression coefficients, estimated missing color sensor values at each pixel location in that region are calculated (step 920).

For each calculated missing color sensor value, a comparison is made between the calculated missing color sensor value and the corresponding interpolated missing color sensor value to determine a difference value (step 925). If the difference value exceeds a threshold amount (step 930), the calculated missing color sensor value is replaced with the interpolated missing color sensor value (step 935). Otherwise, the calculated missing color sensor value is used in the final demosaiced image (step 940). This process is repeated for each calculated missing color sensor value in the image region (step 945).

Once the estimated missing color values in all regions of the image have been calculated (step 950), the final demosaiced image can be output from the digital signal processor for further processing or display (step 955). The final demosaiced image includes the original raw sensor values and either the calculated missing color sensor values or interpolated missing color sensor values at each pixel location.

Although many grid artifacts can be removed by using the simple interpolated color sensor values, if a pixel lies on an edge of an object in the image, using the simple interpolated color sensor value may result in color aliasing artifacts in the image. In areas surrounding an edge of an object in an image, the neighboring color values can vary widely. Therefore, even though grid artifacts may occur, for those pixels that lie on an edge of an object in an image, the calculated missing color sensor values may preserve those edges better than the simple interpolated color sensor values.

Figure 12:
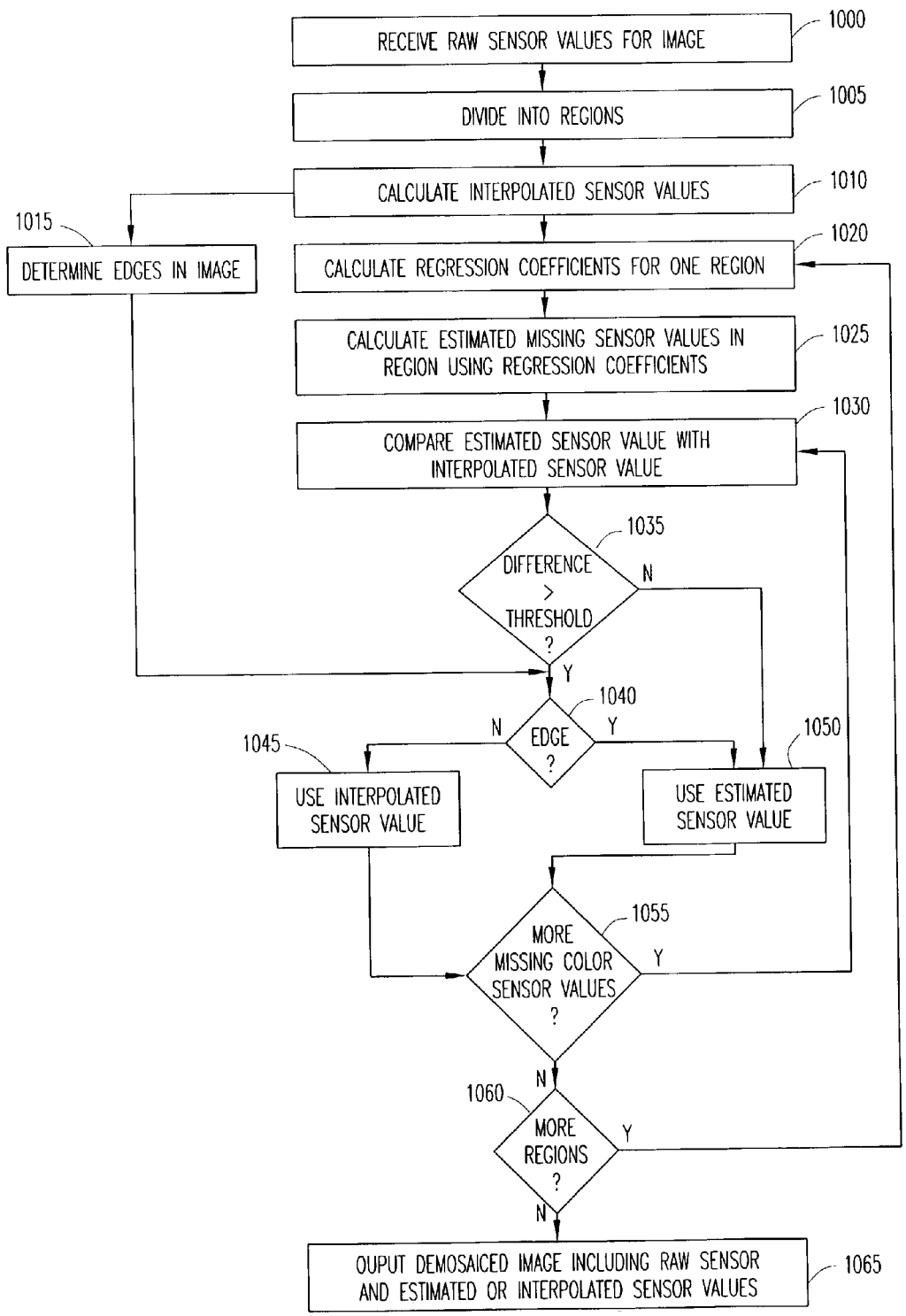
FIG. 12 is a flow chart illustrating exemplary steps for detecting edge regions within an image.

Exemplary steps for removing grid artifacts from an LLR demosaiced image without introducing extra color aliasing around edges in an image are shown in FIG. 12. Upon receipt of the raw sensor values (step 1000) and the division of the raw sensor values into separate regions (step 1005), a simple demosaicing algorithm can be applied to the mosaiced image (step 1010) to create three full color planes (e.g., R, G, and B), each including both original raw and interpolated color sensor values. Thereafter, an edge detection algorithm can be applied to the image region to determine where the edges in the image region occur (step 1015). The detection of edges can be performed using any type of moderately effective edge detection algorithm.

As an example, the following is a description of an edge detection algorithm designed specifically for the Bayer pattern mosaic. As a first step, the four color positions (R, G1, G2, B) in a Bayer pattern are demosaiced separately, as performed in step 1010 above. Thus, at each pixel location, there is a red value, a blue value, a green value for green pixels next to red pixels and a green value for green pixels next to blue pixels. Thereafter, the G1 and G2 demosaic results are averaged to obtain the final G results for the interpolated G values that are used in subsequent processing. Also, the normalized difference of the G1 and G2 demosaic results are calculated ($|G_1-G_2|(G_1+G_2)$) for each pixel to obtain an edge map.

In addition to identifying the pixels that lie on edges in the image region, the linear regression coefficients (slopes and offsets) that describe the linear relationships between the different color planes in that region (step 1020) are determined from both the interpolated and raw sensor values, as described above in connection with FIG. 6, or from only the raw sensor values, as described above in connection with FIG. 7. From the linear regression coefficients, estimated missing color sensor values at each pixel location in that region are calculated (step 1025).

For each calculated missing color sensor value, a comparison is made between the calculated missing color sensor value and the corresponding interpolated missing color sensor value to determine a difference value (step 1030). If the difference value exceeds a threshold amount (step 1035), and the pixel associated with the missing color sensor values does not lie on edge identified as described above (step 1040), the calculated missing color sensor value is replaced with the interpolated missing color sensor value (step 1045). Otherwise, the calculated missing color sensor value is used in the final demosaiced image (step 1050). This process is repeated for each calculated missing color sensor value in the image region (step 1055).

Once the estimated missing color values in all regions of the image have been calculated (step 1060), the final demosaiced image can be output from the digital signal processor for further processing or display (step 1065). The final demosaiced image includes the original raw sensor values and either the calculated missing color sensor values or interpolated missing color sensor values at each pixel location.

In other embodiments, image regions that include areas that violate the linear correlation assumption can be adjusted using different methods. For example, instead of replacing the pixels that violate the linear correlation assumption (violation pixels) with the simple interpolated color sensor values, a more sophisticated linear regression method can be used to determine multiple regression coefficients for regions with several different linear relationships. As a further example, the missing color sensor values at violation pixels can be replaced with sensor values calculated using a demosaicing method which minimizes color aliasing. By way of example, but not limitation, a demosaicing algorithm such as described in commonly assigned, co-pending U.S. patent application Ser. No. 09/940,825 can be used. In another solution, the image can be divided into irregularly shaped regions, each containing at most two different color regions, thereby removing the cause of the linear correlation violation.

The innovative concepts described in the present application can be modified and varied over a wide range of applications. Accordingly, the scope of patented subject matter should not be limited to any of the specific exemplary teachings discussed, but is instead defined by the following claims.

We claim:

1. An image processing system for demosaicing an image represented by raw sensor values generated by pixels within an array of pixels having at least two color planes, each of said pixels within said array of pixels producing a respective one of said raw sensor values in one of the at least two color planes for said image, said image processing system comprising:
   a buffer for storing at least a group of said raw sensor values produced by said pixels within a region of said image, said region being less than said image; and
   a processor connected to receive said group of raw sensor values stored in said buffer, determine regression coefficients representing the linear relations between the color planes for said region using at least said group of raw sensor values and calculate missing color sensor values associated with said pixels in said region of said image using said regression coefficients, said processor configured to use correlation coefficients between different ones of the color planes in said region to determine said regression coefficients.

2. The image processing system of claim 1, wherein said regression coefficients comprise a slope value and an intercept value representing the linear relationship between two of the color planes in said region.

3. The image processing system of claim 2, wherein said regression coefficients comprise a first slope value and a first intercept value for use in calculating said missing color sensor values in a first one of the color planes from said raw sensor values in a second one of the color planes in said region and a second slope value and a second intercept value for use in calculating said missing color sensor values in the second color plane from said raw sensor values in the first color plane in said region.

4. The image processing system of claim 1, wherein a subset of said group of raw sensor values in said region is used to determine said regression coefficients.

5. The image processing system of claim 1, wherein said processor is further configured to calculate correlation coefficients between each of the color planes in said region, said correlation coefficients between two of the color planes including a separate correlation coefficient for each potential position of said pixels in a first one of the color planes relative to the position of said pixels in a second one of the color planes.

6. The image processing system of claim 5, wherein said processor is further configured to select a pixel position for the first color plane associated with a maximum one of said correlation coefficients between the first and second color planes, and each of said raw sensor values in the first color plane generated from said pixels within said selected pixel position relative to said pixels in the second color plane are used to determine said regression coefficients between the first and second color planes.

7. An image processing system for demosaicing an image represented by raw sensor values generated by pixels within an array of pixels having at least two color planes, each of said pixels within said array of pixels producing a respective one of said raw sensor values in one of the at least two color planes for said image, said image processing system comprising:
   a buffer for storing at least a group of said raw sensor values produced by said pixels within a region of said image, said region being less than said image; and
   a processor connected to receive said group of raw sensor values stored in said buffer, determine regression coefficients representing the linear relations between the color planes for said region using at least said group of raw sensor values and calculate missing color sensor values associated with said pixels in said region of said image using said regression coefficients, said processor configured to use a blurred image associated with said region of said image to determine said regression coefficients.

8. The image processing system of claim 7, wherein said regression coefficients are determined using the high spatial frequency components of said group of raw sensor values.

9. The image processing system of claim 7, wherein said processor is further configured to calculate interpolated missing color sensor values for said region form said group of raw sensor values to produce a first demosaiced image, generate said blurred image for said region of said image through a convolution of said interpolated missing color sensor values and said group of raw sensor values with a lowpass kernel, and produce a difference image by subtracting said blurred image from said first demosaiced image, and said regression coefficients are determined using said difference image.

10. The image processing system of claim 9, wherein said processor is further configured to produce a second demosaiced image using said regression coefficients calculated from said difference image and output a final demosaiced image for said region by adding said blurred image to said second demosaiced image.

11. An image processing system for demosaicing an image represented by raw sensor values generated by pixels within an array of pixels having at least two color planes, each of said pixels within said array of pixels producing a respective one of said raw sensor values in one of the at least two color planes for said image, said image processing system comprising:
   a buffer for storing at least a group of said raw sensor values produced by said pixels within a region of said image, said region being less than said image; and a processor connected to receive said group of raw sensor values stored in said buffer, determine regression coefficients representing the linear relations between the color planes for said region using at least said group of raw sensor values and calculate missing color sensor values associated with said pixels in said region of said image using said regression coefficients, said processor configured to calculate interpolated missing color sensor values for said region from said group of raw sensor values and compare said interpolated missing color sensor values with said associated calculated missing color sensor values for each of said pixels within said region to detect grid artifacts produced by said calculated missing color sensor values.

12. The image processing system of claim 11, wherein said processor is further configured to detect and reduce grid artifacts produced by said calculated missing color sensor values.

13. The image processing system of claim 11, wherein said processor is further configured to determine a difference value between said interpolated missing color sensor value in a first one of the color planes and said associated calculated missing color sensor value in the first color plane for a select one of said pixels within said region, said processor being further configured to replace said calculated missing color sensor value with said interpolated missing color sensor value for the first color plane of said select pixel when said difference value exceeds a threshold amount.

14. The image processing system of claim 13, wherein said processor is further configured to detect edges located within said region of said image, said calculated missing color sensor value being used regardless of said difference value when said select pixel lies on one of said edges.

15. A method for demosaicing an image represented by raw sensor values generated by pixels within an array of pixels having at least two color planes, each of said pixels within said array of pixels producing a respective one of said raw sensor values in one of the at least two color planes for said image, said method comprising:
receiving at least a group of said raw sensor values produced by said pixels within a region of said image, said region being less than said image;
determining regression coefficients representing the linear relations between the color planes for said region using at least a portion of said group of raw sensor values, including using correlation coefficients between different ones of the color planes in said region to determine said regression coefficients; and
calculating missing color sensor values associated with said pixels in said region of said image using said regression coefficients.

16. The method of claim 15, wherein said step of determining said regression coefficients further comprises:
calculating a slope value and an intercept value representing the linear relationship between two of the color planes in said region.

17. The method of claim 16, wherein said step of calculating said missing color sensor values further comprises:
calculating said missing color sensor values in a first one of the color planes from said raw sensor values in a second one of the color planes in said region using a first slope value and a first intercept value; and
calculating said missing color sensor values in the second color plane from said raw sensor values in the first color plane in said region a second slope value and a second intercept value.

18. The method of claim 15, wherein said step of determining said regression coefficients further comprises:
calculating correlation coefficients between each of the color planes in said region, said correlation coefficients between two of the color planes including a separate correlation coefficient for each potential position of said pixels in a first one of the color planes relative to the position of said pixels in a second one of the color planes.

19. The method of claim 18, wherein said step of determining said regression coefficients comprises:
selecting a pixel position for the first color plane associated with a maximum one of said correlation coefficients between the first and second color planes; and
determining said regression coefficients between the first and second color planes using each of said raw sensor values in the first color plane generated from said pixels within said selected pixel position relative to said pixels in the second color plane.

20. A method for demosaicing an image represented by raw sensor values generated by pixels within an array of pixels having at least two color planes, each of said pixels within said array of pixels producing a respective one of said raw sensor values in one of the at least two color planes for said image, said method comprising:
receiving at least a group of said raw sensor values produced by said pixels within a region of said image, said region being less than said image;
determining regression coefficients representing the linear relations between the color planes for said region using at least a portion of said group of raw sensor values, including using a blurred image associated with said region of said image to determine said regression coefficients; and
calculating missing color sensor values associated with said pixels in said region of said image using said regression coefficients.

21. The method of claim 20, wherein said step of determining said regression coefficients further comprises:
determining said regression coefficients using the high spatial frequency components of said group of raw sensor values.

22. The method of claim 20, wherein said step of determining said regression coefficients further comprises:
calculating interpolated missing color sensor values for said region from said group of raw sensor values to produce a first demosaiced image;
generating said blurred image for said region of said image through a convolution of said interpolated missing color sensor values and said group of raw sensor values with a lowpass kernel;
producing a difference image by subtracting said blurred image from said first demosaiced image; and
determining said regression coefficients using said difference image.

23. The method of claim 22, further comprising:
producing a second demosaiced image using said regression coefficients calculated from said difference image; and
outputting a final demosaiced image for said region by adding said blurred image to said second demosaiced image.

24. A method for demosaicing an image represented by raw sensor values generated by pixels within an array of pixels having at least two color planes, each of said pixels within said array of pixels producing a respective one of said raw sensor values in one of the at least two color planes for said image, said method comprising:
- receiving at least a group of said raw sensor values produced by said pixels within a region of said image, said region being less than said image;
- determining regression coefficients representing the linear relations between the color planes for said region using at least a portion of said group of raw sensor values;
- calculating missing color sensor values associated with said pixels in said region of said image using said regression coefficients;
- calculating interpolated missing color sensor values for said region from said group of raw sensor values; and
- comparing said interpolated missing color sensor values with said associated calculated missing color sensor values for each of said pixels within said region to detect grid artifacts produced by said calculated missing color sensor values.

25. The method of claim 24, further comprising:
- determining a difference value between said interpolated missing color sensor value in a first one of the color planes and said associated calculated missing color sensor value in the first color plane for a select one of said pixels within said region; and
- replacing said calculated missing color sensor value with said interpolated missing color sensor value for the first color plane of said select pixel when said difference value exceeds a threshold amount.

26. The method of claim 25, further comprising:
- detecting edges located within said region of said image; and
- using said calculated missing color sensor value regardless of said difference value when said select pixel lies on one of said edges.

* * * * *

UNITED STATES PATENT AND TRADEMARK OFFICE
CERTIFICATE OF CORRECTION

PATENT NO. : 7,079,705 B2 Page 1 of 1
APPLICATION NO. : 10/284696
DATED : July 18, 2006
INVENTOR(S) : Zhang et al.

It is certified that error appears in the above-identified patent and that said Letters Patent is hereby corrected as shown below:

On the title page, item (56), under "Other Publications", in column 2, line 3, after "19 (1):" delete "4 9," and insert -- 4-9 --, therefor.

On title page, item (57), under "Abstract", in column 2, line 8, after "region" insert -- . --.

In column 15, line 66, in Claim 17, after "region" insert -- of --.

In column 16, line 11, in Claim 19, after "coefficients" insert -- further --.

Signed and Sealed this

Fifth Day of December, 2006

JON W. DUDAS
*Director of the United States Patent and Trademark Office*